US012326723B2

(12) United States Patent
Kairali et al.

(10) Patent No.: US 12,326,723 B2
(45) Date of Patent: Jun. 10, 2025

(54) DETERMINATION OF EXTENTS OF A VIRTUAL REALITY (VR) ENVIRONMENT TO DISPLAY ON A VR DEVICE

(71) Applicant: International Business Machines Corporation, Armonk, NY (US)

(72) Inventors: Sudheesh S. Kairali, Kozhikode (IN); Sarbajit K. Rakshit, Kolkata (IN); Saraswathi Sailaja Perumalla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 18/082,483

(22) Filed: Dec. 15, 2022

(65) Prior Publication Data
US 2024/0201674 A1 Jun. 20, 2024

(51) Int. Cl.
*G05B 19/418* (2006.01)
*G06T 19/00* (2011.01)

(52) U.S. Cl.
CPC ........ *G05B 19/41885* (2013.01); *G06T 19/00* (2013.01)

(58) Field of Classification Search
CPC .... G05B 19/41885; G05B 2219/31457; G05B 2219/32014; G05B 2219/40131; G05B 2219/40174; G06Q 50/04; B25J 9/1689
See application file for complete search history.

(56) References Cited

U.S. PATENT DOCUMENTS

| 10,956,868 | B1* | 3/2021 | Cronan | G06Q 10/105 |
| 2006/0178559 | A1* | 8/2006 | Kumar | G16H 40/63 |
| | | | | 600/109 |
| 2020/0133610 | A1* | 4/2020 | Vlachou | G06T 15/04 |

FOREIGN PATENT DOCUMENTS

| WO | 2021087455 A1 | 5/2021 |
| WO | 2024/127098 A1 | 6/2024 |

OTHER PUBLICATIONS

International Search Report and Written Opinion from PCT Application No. PCT/IB2023/057746, dated Nov. 8, 2023, 12 pages.
Pham et al., "Survey of Multi-Access Edge Computing in 5G and Beyond: Fundamentals, Technology Integration, and State-of-the-Art," IEEE Access, vol. 8, Jun. 2020, pp. 116974-117017.

(Continued)

*Primary Examiner* — Mong-Shune Chung
(74) *Attorney, Agent, or Firm* — Zilka-Kotab, P.C.

(57) ABSTRACT

A computer-implemented method, according to one approach, includes identifying machines involved in performance of a manufacturing process at a manufacturing location, and identifying a workflow sequence of execution of the machines. Conditions associated with remote operators using virtual reality (VR) devices to remotely control the machines to perform the workflow sequence of execution at the manufacturing location are received. The method further includes determining, for each of the VR devices, an extent of a VR collaborative environment to display. The extents are determined based on the conditions, thereby reducing latency in performance of the workflow sequence of execution at the manufacturing location. The method further includes outputting the extents to the VR devices.

20 Claims, 6 Drawing Sheets

(56) References Cited

OTHER PUBLICATIONS

Hu et al., "Virtual Reality: A Survey of Enabling Technologies and its Applications in IoT," arXiv, 2021, 19 pages, retrieved from https://arxiv.org/abs/2103.06472.
Ebrahimzadeh et al., "Delay-Constrained Teleoperation Task Scheduling and Assignment for Human+Machine Hybrid Activities Over FiWi Enhanced Networks," IEEE Transactions on Network and Service Management, vol. 16, No. 4, Dec. 2019, pp. 1840-1854.
Du et al., "Zero latency: Real-time synchronization of BIM data in virtual reality for collaborative decision-making," Automation in Construction, vol. 85, 2018, pp. 51-64.
Gital et al., "Throughput Analysis of TCP Congestion Control Algorithms in a Cloud Based Collaborative Virtual Environment," IEEE First International Conference on Systems Informatics, Modelling and Simulation, 2014, pp. 195-200.
Anonymous, "Method and Apparatus to Support Remote Collaborations and Navigations with 360 Degree Cameras," IP.com Prior Art Database, Technical Disclosure No. IPCOM000251841D, Dec. 6, 2017, 6 pages.
Elvezio et al., "Collaborative Virtual Reality for Low-Latency Interaction," UIST '18 Adjunct: The 31st Annual ACM Symposium on User Interface Software and Technology Adjunct Proceedings, Oct. 2018, pp. 179-181.
Zhang et al., "CARS: Collaborative Augmented Reality for Socialization," HotMobile'18, Session: Augmentation, Feb. 2018, pp. 25-30.
Khalid et al., "Optimal Latency in Collaborative Virtual Environment to Increase User Performance: A Survey," International Journal of Computer Applications, vol. 142, No. 3, May 2016, pp. 35-47.

\* cited by examiner (contined)

DETERMINATION OF EXTENTS OF A VIRTUAL REALITY (VR) ENVIRONMENT TO DISPLAY ON A VR DEVICE

BACKGROUND

The present invention relates to virtual reality (VR), and more specifically, this invention relates to determining extents of a VR environment to display on a VR device that is configured to control a machine performing operations of a workflow sequence.

VR is a three-dimensional, computer-generated environment which can be explored and interacted with by a person. This person becomes part of a virtual world and/or is immersed within this environment and whilst there, is able to manipulate objects and/or perform a series of actions. VR benefits the manufacturing sector by improving worker safety, refining the production of products, saving manufacturers money, enabling remote controlling of machine operations, allowing monitoring of various machines on an industrial floor, etc. More specifically, in some cases, VR enables remote control operation and monitoring of machines, e.g., starting, stopping, changing operational parameters of the machines, etc., by operators using VR devices from one or more remote locations.

Throughout any industrial floor, there may be different machines which are located and operate in different portion of the industrial floor. Here the machines are able to collaborate with one another to perform a common task or execute any manufacturing workflow. For context, a "workflow" may be defined as one or more operations that are performed in order to accomplish a predetermined task. More specifically, such as task may be accomplished as a result of one or more machines performing machine operations according to a "workflow sequence." Within this workflow sequence, the one or more machines perform the machine operations in parallel and/or sequentially in an interconnected manner. In some cases, each of the machines may be assigned specific work tasks to perform, while in some other cases, a plurality of the machines may additionally and/or alternatively operate together to perform a single machine operation. On any industrial floor, relative positions and direction of these machines may be monitored and controlled to align with a workflow sequence of the machines.

A human, e.g., hereafter referred to as "remote operator" may use a VR device to remotely control a machine to perform machine operations. For example, the remote operator may wear a known type of VR glasses to view robotic arms of the machine, and use hand-held control(s) to control the robotic arms. While remotely controlling, monitoring or operating any machine on any industrial floor, the remote operator may visualize the target machine in a respective "VR environment" and perceive themselves as actually being on the industrial floor where the machine is. At the same time, various other remote operators may also be remotely controlling, monitoring or operating other machines in a surrounding area. In this case, different operators may have a different speed of operation, level of internet bandwidth, experience in controlling a machine using a VR device, etc. Accordingly, for at least some implementations in which commands issued by the operators are submitted remotely using the VR devices for the machines to execute in a workflow sequence, timing of execution of commands on respective machines is important, e.g., to prevent the machines from performing operations of the workflow sequence out of order. During VR interaction among multiple operators, and because of one or more types of latency associated with conditions of the remote operators, the machines may experience issues properly executing the commands in the workflow sequence. At the same time, latency in submitting or executing a command also impacts productivity in the context of the workflow sequence. Accordingly, there is a need for techniques that mitigate latency in submitted commands. Furthermore, even where latency is present in a plurality of received machine commands, e.g., as a result of one or more VR devices with relatively low internet bandwidth issuing machine commands, there is a need for techniques that enable an execution of the machine commands in a synchronized manner.

SUMMARY

A computer-implemented method, according to one approach, includes identifying machines involved in performance of a manufacturing process at a manufacturing location, and identifying a workflow sequence of execution of the machines. A relative scope of tasks that a given one of the machines has in the manufacturing process is known based on these identifications, as well as how this scope relates to operations performed by one or more of the other machines in the workflow sequence of execution. Conditions associated with remote operators using virtual reality (VR) devices to remotely control the machines to perform the workflow sequence of execution at the manufacturing location are received. Relative internet bandwidths of the VR devices is one of such conditions, and by considering such conditions, extents of a VR collaborative environment that is displayed by the VR devices may be tailored such that the conditions do not introduce latency into the workflow sequence of execution. In order to prevent such latency, an extent of a VR collaborative environment to display is determined for each of the VR devices. The extents are determined based on the conditions, thereby reducing latency in performance of the workflow sequence of execution at the manufacturing location. The extents are output to the VR devices. This allows the remote operators to remotely operate and control the machines as if the remote operator is actually working at the manufacturing location, without the remote working having to incur the potential danger of being physically present at the manufacturing location.

Determining the extents of the VR collaborative environment includes determining a first of the machines remotely controlled by a first of the VR devices having a relatively lower internet bandwidth, and determining a second of the machines remotely controlled by a second of the VR devices having a relatively higher internet bandwidth. As a result of determining such relative differences in internet bandwidths, an extent of a VR collaborative environment that is determined for and output for display by the first VR device includes relatively less clarity and/or contents than an extent of a VR collaborative environment that is determined for and output for display by the second VR device. Accordingly, the extent of a VR collaborative environment that is determined for and output for display by the first VR device reduces a potential of the first VR device to introduce latency into the workflow sequence of execution based on the relatively lower internet bandwidth. This reduction in latency improves performance of computer devices used in performance of the workflow sequence of execution. This also results in less waste within the production process at the manufacturing location because errors that would otherwise result in the production process as a result of such latency are avoided.

A computer program product, according to another approach, includes a computer readable storage medium having program instructions embodied therewith. The program instructions are readable and/or executable by a computer to cause the computer to perform the foregoing method.

A system, according to another approach, includes a processor, and logic integrated with the processor, executable by the processor, or integrated with and executable by the processor. The logic is configured to perform the foregoing method.

Other aspects and approaches of the present invention will become apparent from the following detailed description, which, when taken in conjunction with the drawings, illustrate by way of example the principles of the invention.

DETAILED DESCRIPTION

Figure 1:
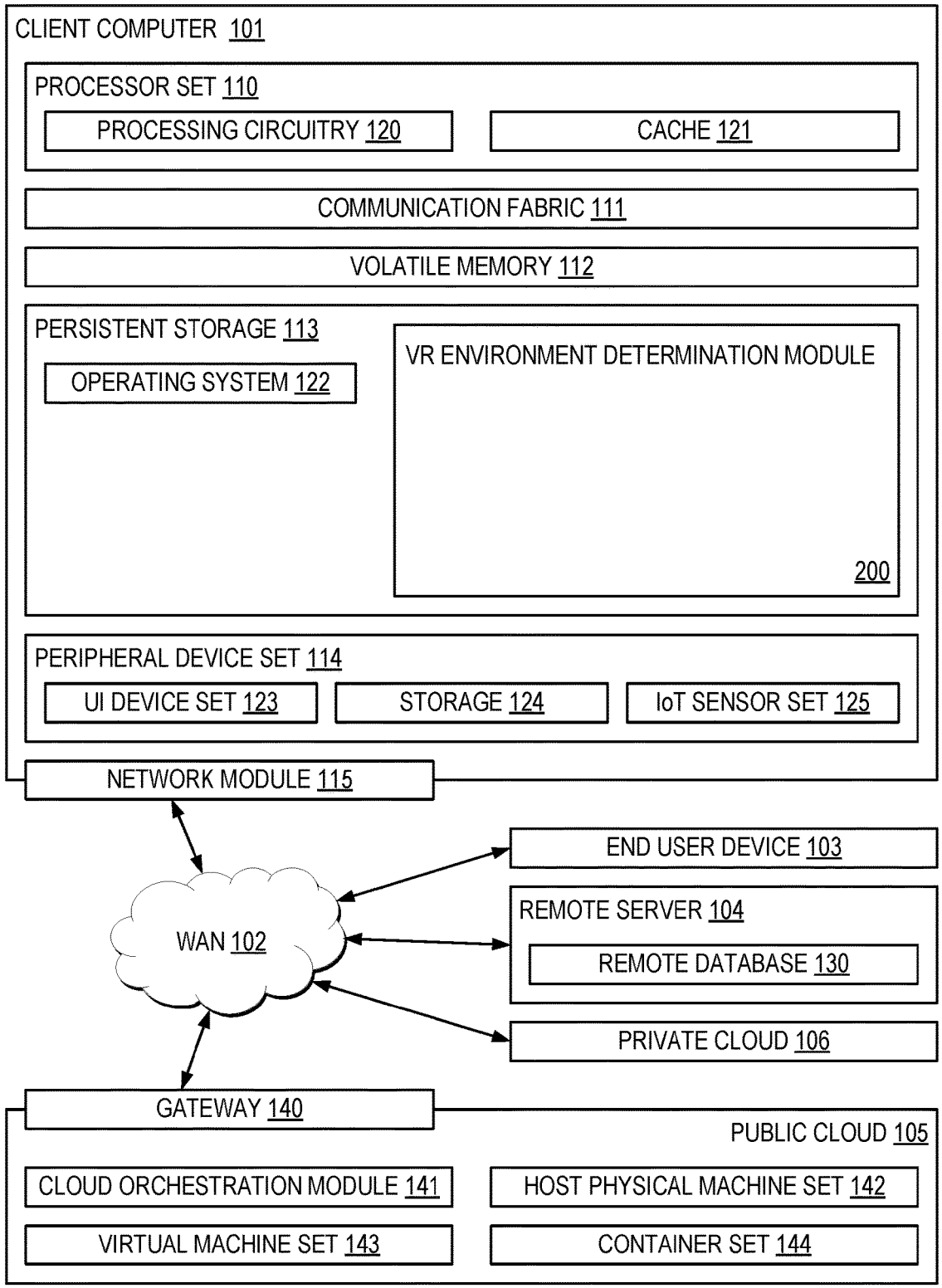
FIG. 1 is a diagram of a computing environment, in accordance with one approach of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for determining extents of a virtual reality (VR) environment to display on a VR device that is configured to control a machine performing operations of a workflow sequence.

In one general approach, a computer-implemented method includes identifying machines involved in performance of a manufacturing process at a manufacturing location, and identifying a workflow sequence of execution of the machines. Conditions associated with remote operators using virtual reality (VR) devices to remotely control the machines to perform the workflow sequence of execution at the manufacturing location are received. The method further includes determining, for each of the VR devices, an extent of a VR collaborative environment to display. The extents are determined based on the conditions, thereby reducing latency in performance of the workflow sequence of execution at the manufacturing location. The method further includes outputting the extents to the VR devices.

In another general approach, a computer program product includes a computer readable storage medium having program instructions embodied therewith. The program instructions are readable and/or executable by a computer to cause the computer to perform the foregoing method.

In another general approach, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as VR environment extent determination module of block 200 for determining extents of a VR environment to display on a VR device that is configured to control a machine performing operations of a workflow sequence. In addition to block 200, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic;

software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As mentioned elsewhere above, virtual reality (VR) is a three-dimensional, computer-generated environment which can be explored and interacted with by a person. This person becomes part of a virtual world and/or is immersed within this environment and whilst there, is able to manipulate objects and/or perform a series of actions. VR benefits the manufacturing sector by improving worker safety, refining the production of products, saving manufacturers money, enabling remote controlling of machine operations, allowing monitoring of various machines on an industrial floor, etc. More specifically, in some cases, VR enables remote control operation of and monitoring of machines, e.g., starting, stopping, changing operational parameters of the machines, etc., by operators using VR devices from one or more remote locations.

Throughout any industrial floor, there may be different machines which are located and operate in different portion of the industrial floor. Here, the machines are able to collaborate with one another to perform a common task or execute any manufacturing workflow. For context, a "workflow" may be defined as one or more operations that are performed in order to accomplish a predetermined task. More specifically, such a task may be accomplished as a result of one or more machines performing machine operations according to a "workflow sequence." Within this workflow sequence, the one or more machines perform the machine operations in parallel and/or sequentially in an interconnected manner. In some cases, each of the machines may be assigned specific work tasks to perform, while in some other cases, a plurality of the machines may additionally and/or alternatively operate together to perform a single machine operation. On any industrial floor, relative positions and direction of these machines may be monitored and controlled to align with a workflow sequence of the machines.

A human, e.g., hereafter referred to as "remote operator" may use a VR device to remotely control a machine to perform machine operations. For example, the remote operator may wear a known type of VR glasses to view robotic arms of the machine, and use hand-held control(s) to control the robotic arms. While remotely controlling, monitoring or operating any machine on any industrial floor, the remote operator may visualize the target machine in a respective "VR environment" in which the remote operator may remotely view a perspective of actually being on the industrial floor where the machine is. At the same time, various other remote operators may also be remotely controlling, monitoring or operating other machines in a surrounding area. In this case, different operators may have a different speed of operation, level of internet bandwidth, experience in controlling a machine using a VR device, etc. Accordingly, for at least some implementations in which commands issued by the operators are submitted remotely using the VR devices for the machines to execute in a workflow sequence, timing of execution of commands on respective machines is important, e.g., to prevent the machines from performing operations of the workflow sequence out of order. During VR interaction among multiple operators, and because of one or more types of latency associated with conditions of the remote operators, the machines may experience issues properly executing the commands in the workflow sequence. At the same time, latency in submitting or executing a command also impacts productivity in the context of the workflow sequence. Accordingly, there is a need for techniques that mitigate latency in submitted commands. Furthermore, even where latency is present in a plurality of received machine commands, e.g., as a result of one or more VR devices with relatively low internet bandwidth issuing machine commands, there is a need for techniques that enable an execution of the machine commands in a synchronized manner.

In sharp contrast to the various deficiencies described above, the techniques of various approaches described herein include identifying a workflow sequence of execution of machines participating in a manufacturing process of an industrial floor. Then, based on conditions associated with remote operators using VR devices to remotely control the machines, e.g., internet bandwidth available to different remote operators who are performing the activities from a remote location using VR devices, an extent of a VR collaborative environment to display on the VR devices is determined and output. This way, latency in performance of the workflow sequence of execution at the manufacturing location may be minimized. For example, a first operator may have access to a relatively slower internet bandwidth while a second operator may have access to a relatively faster internet bandwidth. Accordingly, for the first operator, only a target machine that the first operator is actively controlling may be shown on an extent of the VR environment displayed on a VR device of the first operator. Meanwhile, based on the second operator having access to relatively faster internet bandwidth, each and every machine involved in the manufacturing process may be shown on an extent of the VR environment displayed on a VR device of the second operator.

Figure 2A:
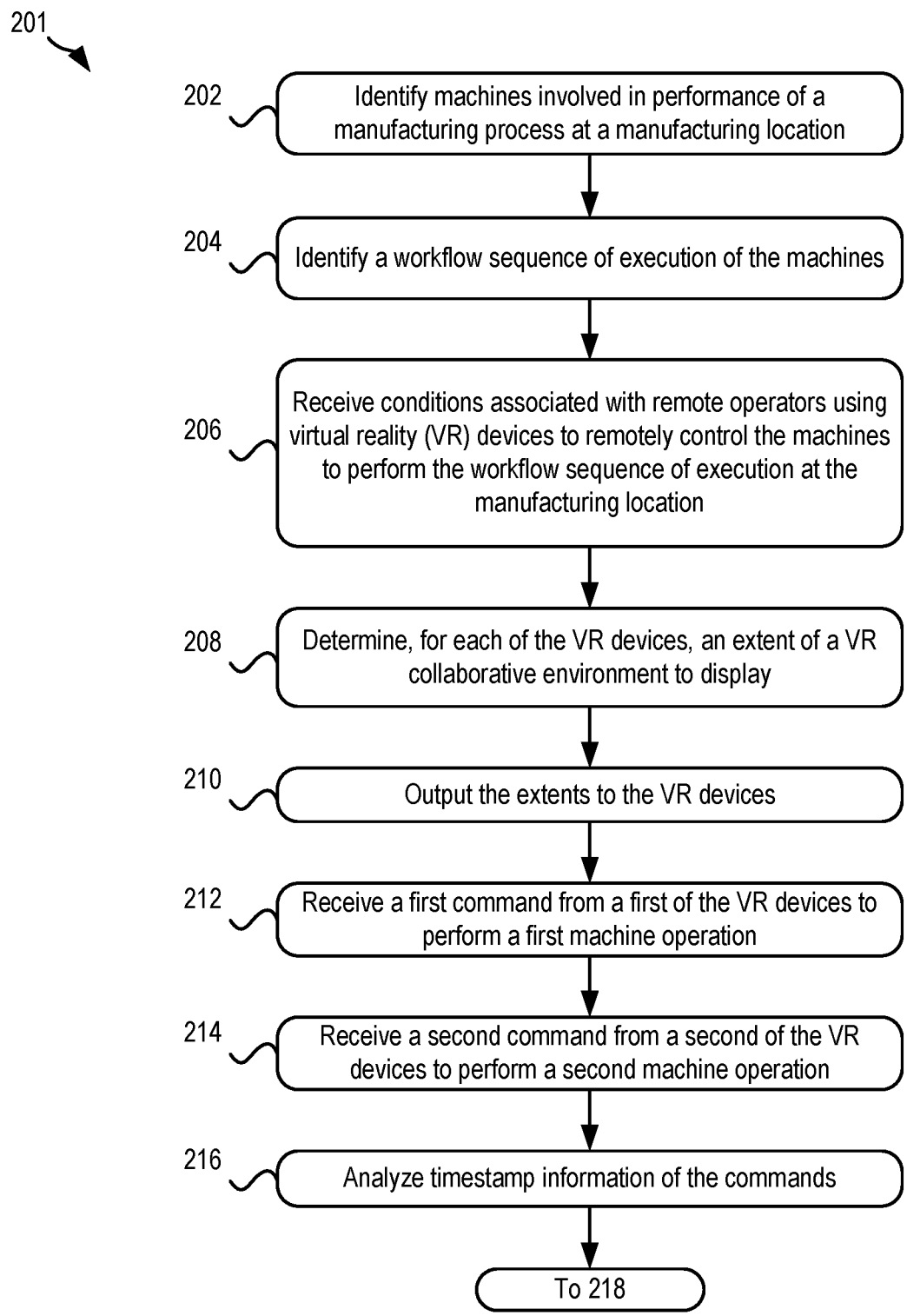
FIG. 2A is a flowchart of a method, in accordance with one approach of the present invention.
Figure 2A:
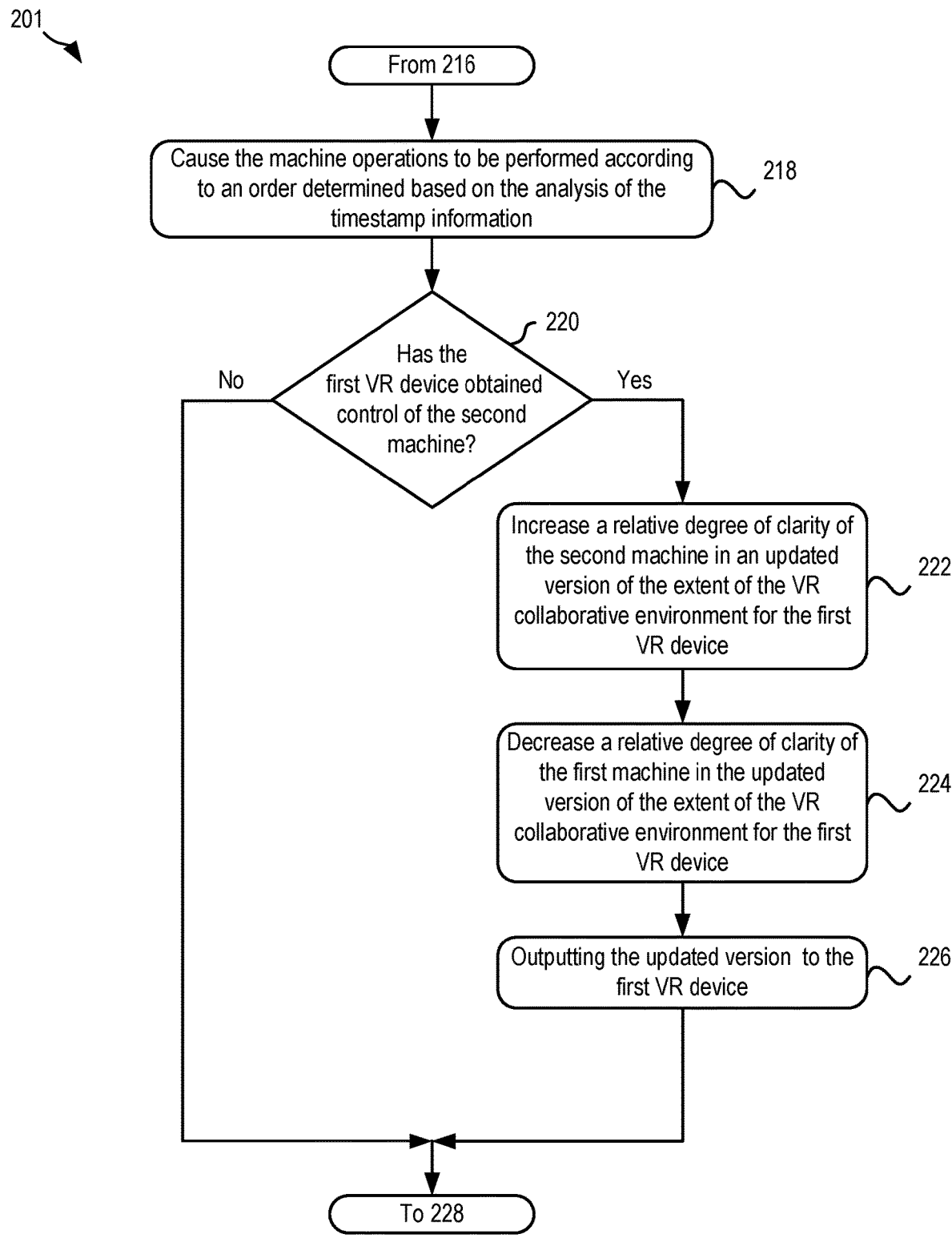
Figure 2A:
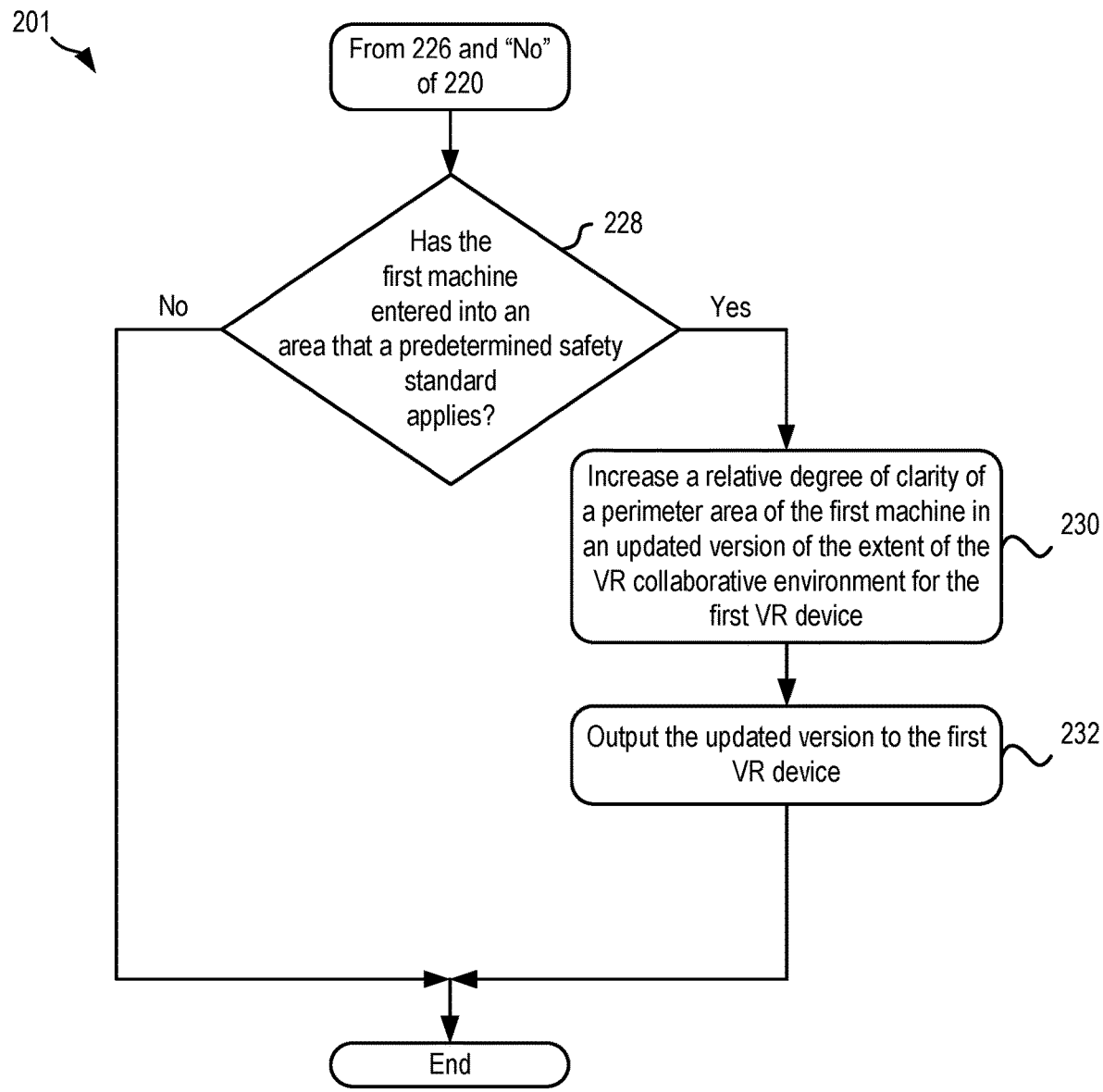

Now referring to FIG. 2A, a flowchart of a method 201 is shown, according to one approach. The method 201 may be performed in accordance with the present invention in any of the environments depicted in FIGS. 1-3, among others, in various approaches. Of course, more or fewer operations than those specifically described in FIG. 2A may be included in method 201, as would be understood by one of skill in the art upon reading the present descriptions.

Each of the steps of the method 201 may be performed by any suitable component of the operating environment. For example, in various approaches, the method 201 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 201. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes identifying machines, e.g., types of machines, identifications of machines, a collection of machines, etc., involved in the performance of a manufacturing process at a manufacturing location. In some approaches, the identification is performed by issuing a query to a plurality of machines that requests operating responsibilities of each of the machines. In another approach, the machines may be identified from network information. In yet another approach, the machines may be identified by observing the manufacturing location and determining which machines present in the manufacturing location are actively involved in performing machine operations related to the manufacturing process of a product. The machines may be of a known type, e.g., robots, welding machines, sewing machines, hammering machines, molding machines, etc., that are configured to receive commands, e.g., issued by a VR device controlled by a remote operator, and in response thereto, perform one or more machine operations.

For context, the VR devices may include known types of VR viewing devices, e.g., such as augmented reality (AR) glasses, a device display, VR glasses, a front facing camera device with a display component, etc. In some preferred approaches, the VR devices are configured to display a perspective of the manufacturing location that one or more cameras, e.g., mounted above the machine, mounted to the machine, integrated in the machine, etc., views. As will be described in greater detail elsewhere herein, the manufacturing location may be modeled as a VR collaborative environment to display on one or more of the VR devices. More specifically, each VR collaborative environment may be a representation of the manufacturing location that may include all or less than all of the contents, e.g., machines, obstacles, clarity, light, etc., that actually exist in the manufacturing location. For example, the VR collaborative environment that is displayed on a given one of the VR devices may model about a perspective that is seen at any given time by a camera of an associated machine that is controlled by the VR device. This way, a remote operator wearing the VR device is able to operate and control the machine as if the remote operator is actually working at the manufacturing location, while avoiding any potential danger of being physically present at the manufacturing location.

A workflow sequence of execution of the machines may be identified, e.g., see operation 204. As mentioned elsewhere herein, a "workflow" may be defined as one or more operations that are performed in order to accomplish a predetermined task, where the performed operations establish the "workflow sequence of execution." More specifically, such tasks may be accomplished as a result of one or more machines performing machine operations according to a "workflow sequence." Within this workflow sequence, the one or more machines perform the machine operations in parallel and/or sequentially in an interconnected manner. In some cases, each of the machines may be assigned specific work tasks to perform, while in some other cases, a plurality of the machines may additionally and/or alternatively operate together to perform a single machine operation. On any industrial floor, relative positions and directions of the machines may be monitored and controlled to align with a workflow sequence of the machines. Accordingly, in some approaches, the workflow sequence may be identified by monitoring the operation of the machines, e.g., for a predetermined amount of time, until a determination is made that a product has been produced a predetermined amount of time, until operational responsibilities of at least a predetermined number of the machines has been observed and determined, etc. In some other approaches, the workflow sequence may be identified from commands issued to the machines from the VR devices controlled by remote operators. For example, the workflow sequence may include each of the machine commands issued by remote operators via the VR devices to the machines.

Conditions associated with the remote operators using the VR devices to remotely control the machines to perform the workflow sequence of execution at the manufacturing location are received, e.g., see operation 206. For context, in some preferred approaches, these conditions associated with the remote operators using the VR devices are conditions that may cause the introduction of latency into the transmission of commands via the VR devices to perform machine operations. For example, in one preferred approach, the conditions are relative internet bandwidths of the VR devices, e.g., internet bandwidths available to the VR devices, internet bandwidths that one or more of the VR devices are connected to, internet bandwidths by which the VR devices output the commands for the machines to perform machine operations, etc. For context, different VR devices having different internet bandwidths may introduce latency into the transmission of commands via the VR devices based on an order in which the commands are received not matching an order in which the commands were previously sent. For purposes of an example, it may be assumed that a first VR device has relatively less internet bandwidth than a second VR devices. Based on this difference in bandwidth, a first command may be issued by the first VR device before a second command is issued by the second VR device, but the second command may be received before the first command is received. In some other approaches, the conditions may additionally and/or alternatively include, e.g., a safety record of the operators, an amount of time since the operator has taken a most recent break from work, a relative skill level and/or proficiency level of the operators, etc.

In some approaches, in order to account for these condition(s) and thereby reduce latency in performance of the workflow sequence of execution at the manufacturing location, an extent of the VR collaborative environment to display on the VR devices may be determined based on the conditions. For example, operation 208 includes determining, for each of the VR devices, an extent of a VR collaborative environment to display. For context, as will be described below, accounting for these conditions may include tailoring a unique extent of the VR collaborative environment for each of the VR devices to ensure that the conditions do not introduce latency into the workflow sequence of execution at the manufacturing location. This thereby reduces latency in performance of the workflow sequence of execution at the manufacturing location that would otherwise be present without using the techniques described herein. A reduction in latency improves the performance of computer devices used in performance of the workflow sequence of execution. This also results in less waste in the production process at the manufacturing location because errors that would otherwise result in the production process as a result of such latency are avoided.

Various illustrative techniques for determining the extents of the VR collaborative environment will now be described below. For example, looking to FIG. 2B, exemplary sub-operations for determining the extents of the VR collaborative environment are illustrated in accordance with one approach, one or more of which may be used to perform operation 208 of FIG. 2A. However, it should be noted that the sub-operations of FIG. 2B are illustrated in accordance with one approach which is in no way intended to limit the invention.

Figure 2B:
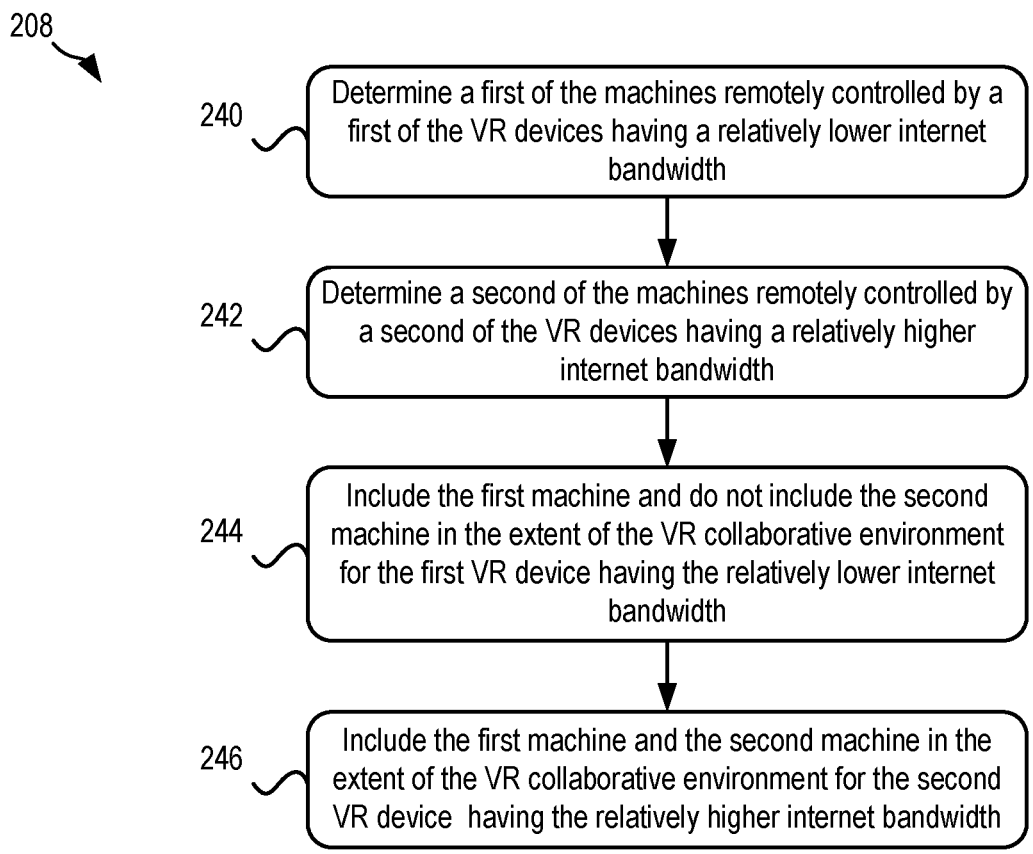
FIG. 2B is a flowchart of sub-operations of an operation of FIG. 2A, in accordance with one approach of the present invention.

With reference now to FIG. 2B, a sub-process is shown in which bandwidth conditions are considered for determining the extents of the VR collaborative environment in order to optimize the VR collaboration effectiveness and a management of latency in execution of the workflow sequence. Sub-operation 240 includes determining a first of the machines remotely controlled by a first of the VR devices having a relatively lower internet bandwidth, e.g., relatively higher latency. Such a determination may be based on comparing an internet bandwidth with the internet bandwidth(s) of one or more other VR devices, e.g., a second VR device. In sub-operation 242, a second of the machines remotely controlled by a second of the VR devices having a relatively higher internet bandwidth is determined, e.g., relatively low latency. In some approaches, in order to mitigate latency that would otherwise result from the first VR device outputting machine commands using the relatively lower internet bandwidth, an extents of the VR collaborative environment may be reduced, e.g., to only include one more relevant portions of the VR collaborative environment. For example, a machine that the first VR device remotely controls, e.g., a target device, is preferably considered relevant, while a machine that the first VR device does not remotely control may not be considered relevant, e.g., a non-target device. For example, in sub-operation 244, the first machine is included in and the second machine is not included in the extent of the VR collaborative environment for the first VR device having the relatively lower internet bandwidth. This inclusion and exclusion (respectively) may be performed in response to a determination that the first VR device has the relatively lower internet bandwidth. As a result of not including the second machine in the extent of the VR collaborative environment for the first VR device having the relatively lower internet bandwidth, bandwidth potential is preserved. This translates to a relative reduction to latency in performance of the workflow sequence of execution at the manufacturing location, because the first VR device receives relatively less bandwidth intensive extents of the VR collaborative environment, thereby allowing outputs of machine commands to be relatively more efficient, e.g., not delayed. In contrast, sub-operation 246 includes including the first machine and the second machine in the extent of the VR collaborative environment for the second VR device in response to a determination that the second VR device has the relatively higher internet bandwidth. Note that the second VR device has access to the relatively greater internet bandwidth and therefore can afford to incur costs associated with downloading the additional extents of the VR collaborative environment, without adding latency to the performance of the workflow sequence of execution at the manufacturing location.

It should be noted that, although various approaches herein are described from the perspective of a first VR device and a second VR device, in some other approaches, method 201 may optionally include tiering extents of the VR collaborative environment for more than two VR devices according to a plurality of relative bandwidth speeds, e.g., relative bandwidth speeds of five VR devices, relative bandwidth speeds of fifty VR devices, relative bandwidth speeds of one-hundred VR devices, etc.

With continued reference to FIG. 2B, in some approaches, an alternative to including some of the machines in an extents of the VR collaborative environment while not including other machines includes increasing a relative clarity of some of the machines, e.g., target machine(s), and reducing a relative clarity of some of the machines, e.g., target machine(s) in the VR collaborative environment. For example, an optional approach for determining the extents of the VR collaborative environment may include, in response to a determination that the first VR device has a relatively lower internet bandwidth, the first machine may be assigned to have a relatively higher degree of clarity than a degree of clarity of the second machine in the extent of the VR collaborative environment for the first VR device. Furthermore, in response to a determination that the second VR device has the relatively higher internet bandwidth, the first machine may be assigned to have about a same degree of clarity as a degree of clarity of the second machine in the extent of the VR collaborative environment for the second VR device.

Figure 2C:
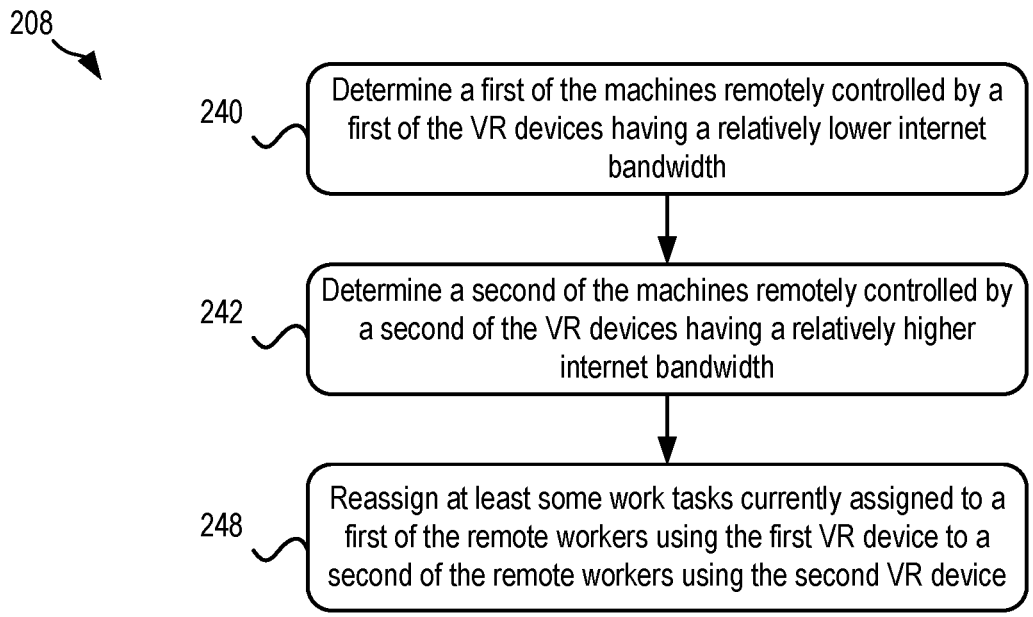
FIG. 2C is a flowchart of sub-operations of an operation of FIG. 2A, in accordance with one approach of the present invention.

Referring now to FIG. 2C, exemplary sub-operations for determining the extents of the VR collaborative environment are illustrated in accordance with one approach, one or more of which may be used to perform operation 208 of FIG. 2A. However, it should be noted that the sub-operations of FIG. 2C are illustrated in accordance with one approach which is in no way intended to limit the invention.

With reference now to FIG. 2C, in some approaches, based on the level of available bandwidth, the proposed VR collaboration techniques may identify which remote activities may be restricted for one or more remote operators having a relatively lower level of available bandwidth. As a result, bandwidth of at least some of these VR devices of these different remote operators may be preserved. In response thereto, work may be dynamically assigned to different workers, e.g., other workers having a relatively higher level of available bandwidth. Based on the internet bandwidth available to the different VR devices, with different workers initiating the performance of activities remotely in a collaborative manner, the proposed techniques may dynamically assign different work to different remote operators and may also identify which work assignments are to be disabled and/or reassigned. For example, a first of the machines remotely controlled by a first of the VR devices having a relatively lower internet bandwidth may be determined, e.g., see sub-operation 240. Furthermore, a second of the machines remotely controlled by a second of the VR devices having a relatively higher internet bandwidth may additionally and/or alternatively be determined, e.g., see sub-operation 242. In some approaches, based on one or more of these determinations, at least some work tasks currently assigned to a first of the remote operators using the first VR device may be reassigned to a second of the remote operators using the second VR device, e.g., see sub-operation 248. In an alternate approach, based on one or more of these determinations, at least some work tasks currently assigned to the first remote operator may additionally and/or alternatively be cancelled.

In some optional approaches, method 201 may include training an artificial intelligence (AI) model to determine and/or update the extents of the VR collaborative environment. More specifically, in one or more of such approaches, the input of the trained model may include information, e.g., conditions, current assignments of work tasks, any of the other information described elsewhere herein that is used to determine the extents, etc., and an output of the trained model may include the extents. In some approaches, a subject matter expert (SME) may review the inputs and outputs of the model and apply rewards and/or corrective feedback as a part of the training process.

As will be described elsewhere herein, determining and/or updating of the extents of the VR collaborative environment may additionally and/or alternatively be based on predetermined safety standards, e.g., see decision 228-operation 232.

With reference again to FIG. 2A, the determined extents are output to associated ones of the VR devices, e.g., see operation 210.

The VR remote collaboration techniques described herein may additionally and/or alternatively evaluate command receiving time lag from VR devices having different latency in communication. In some approaches, based on this latency one or more operations may be performed in order to validate operations with such latency with the workflow sequence of execution of the machines. This way, commands performed in different machines are ensured to be corrected to an appropriate time of execution, e.g., one that is not out of an order of the workflow sequence of execution as a result of the latency.

In some approaches, timestamps associated with machine commands received from different VR devices for different machines may be analyzed. Based on this analysis, in response to a determination that a timestamp is deviating from actual execution sequence, corrections may be performed to the sequence. Furthermore, in response thereto, additional buffer latency may be incorporated in the workflow sequence of execution to allow for operations to be executed relatively smoothly, e.g., without latency. For purposes of an illustrative example, it may be assumed that a first command is received from a first of the VR devices to perform a first machine operation, e.g., see operation 212. A second command may be received from a second of the VR devices to perform a second machine operation, e.g., see operation 214. It may be assumed, in the current approach, that the first command is received before the second command is received. Timestamp information of the commands may be analyzed to determine whether the second command was output by the second VR device before the first command was output by the first VR device, e.g., see operation 216. For example, techniques that would become appreciated by one of ordinary skill in the art upon reading descriptions herein may be used to compare the timestamp information to determine which of the commands were output by a VR device first. For context, this analysis may be performed to determine whether internet bandwidth latency is at least one of the reasons that the first command is received before the second command is received. More specifically, the analysis may be performed to determine whether the second VR device initiated an output of the second command before the first VR device initiated an output of the first command but based on a relatively higher internet bandwidth of the first VR device, the first command is received before the second command is received. In other words, the second machine operation may actually be intended to be performed before the first machine operation in the workflow sequence of execution.

Operation 218 includes causing the machine operations to be performed according to an order determined based on the analysis of the timestamp information. In one approach, in response to a determination based on the analysis of the timestamp information, that the second command was output by the second VR device before the first command was output by the first VR device, the second machine operation may be caused to be performed before the first machine operation. This operation mitigates latency present in the order in which the commands are received from being incorporated into an order in which the machine operations are performed by the machines. In some approaches, the analysis may additionally and/or alternatively compare timestamp information of the same VR device and/or machine. For purposes of an illustrative example, it may be assumed that a first operator has submitted a machine command for a first machine at time T1, and thereafter a machine command is received from a VR device of the first operator for a second machine at time T2. In some approaches, ideally, the second machine command should be executed first. Accordingly, method 201 may include causing this correction to be made, e.g., issuing an instruction for the second machine command to be issued before the first machine command.

In some approaches, one or more of the remote operators may have a scope of work responsibilities that causes the remote operators to use a VR device to operate with more than one of the machines at the manufacturing location. Accordingly, in some approaches, determining and/or updating of the extents of the VR collaborative environment may additionally and/or alternatively be based on which of the machines the VR device currently remotely controls. For example, a remote operator may need to perform the activities with multiple machines from time to time, and accordingly, based on a virtual mobility of the worker in the VR collaborative environment, the level of clarity of different portions of the VR collaborative environment may be changed from time to time, e.g., based on the sequence of activity of the worker. Accordingly, it may be determined whether a VR device, e.g., a first VR device that is currently in control of a first of the machines, obtains control of a second machine, e.g., see decision 220. In one example, it may continue to be assumed that the first machine is remotely controlled by a VR device having relatively lower internet bandwidth, and that the second machine is remotely controlled by a VR device having relatively higher internet bandwidth. Furthermore, it may be assumed that a first VR device is initially in control of a first machine and not in control of the second machine. In some approaches, in response to a determination that the first VR device obtains control of the second machine, e.g., such as part of a work sequence in which the remote operator of the first VR device is granted authorization to control the second machine, a relative degree of clarity of the second machine may be increased in an updated version of the extent of the VR collaborative environment for the first VR device, e.g., see operation 222. Furthermore, in response to the determination that the first VR device obtains control of the second machine, a relative degree of clarity of the first machine may be decreased in the updated version of the extent of the VR collaborative environment for the first VR device, e.g., see operation 224. The updated version of the extent of the VR collaborative environment for the first machine may be output to the first VR device, e.g., see operation 226. For purposes of an example that includes more than two machines, it may be assumed that a first operator first operates machine A via a first VR device, but in the surrounding area of the manufacturing location, e.g., within a predetermined proximity, other machines are also present such as machines B, C, D, E etc. Accordingly, in response to a determination that the first VR device experiences relatively poor bandwidth, the extent of the VR collaborative environment for the first VR device may include machine A with highest degree of clarity while the remaining machines are included with a relatively lowest degree of clarity. Thereafter, in response to a determination that the first operator has a next activity scheduled on machine B and/or the first VR device has gained control of machine B, then machine B may be included with a relatively highest degree of clarity in the extent of the VR collaborative environment for the first VR device.

One or more areas of the manufacturing location may, in some approaches, be subject to one or more predetermined safety standards. These predetermined safety standards may be set by, e.g., a supervisor of the manufacturing location, governing law, a safety officer of the manufacturing location, etc., and may be enforced to ensure that the machines operate relatively safety while collaboratively performing the workflow sequence of execution. For example, while constructing a collaborative VR environment for different VR devices having varied internet bandwidth, some approaches may include identifying whether information regarding the industrial floor surroundings is also to be included in an extent of the VR collaborative environment along with a target machine. Accordingly, levels of clarify of different portions of the VR collaborative environment may be determined and included in the extent of the VR collaborative environment based on a required degree of safety in different areas of the manufacturing location. For example, a first area of the manufacturing location may contain hazardous waste and be therefore subject to safety protocols which specify that machines within the first area maintain a predetermined proximity from one another. This may help ensure that a collision between two or more machines does not occur, which may otherwise result in a hazardous waste spill event occurring. Accordingly, in such an example, it may be important for remote operators that control machines within the first area to view an extent of the VR collaborative environment that includes a machine that the remote operator is controlling as well as other machines in the first area that may come within a predetermined proximity of the first machine. For purposes of another example, it may be assumed that a predetermined safety standard applies to a first area of the manufacturing location. Decision 228 includes determining whether a first machine has entered into an area that a predetermined safety standard applies. In response to a determination that a first of the machines, e.g., a target device for the first VR device, remotely controlled by a first of the VR devices has entered into and/or is scheduled to enter into the first area, e.g., as illustrated by the "Yes" logical path of decision 228, a relative degree of clarity of a predetermined extent of a perimeter area of the first machine may be increased in an updated version of the extent of the VR collaborative environment for the first VR device, e.g. see operation 230. One or more other areas of the manufacturing location in a view of the machine that the predetermined safety standard does not apply to may have an associated degree of clarity decreased in the updated version of the extent of the VR collaborative environment for the first VR device. The updated version of the extent of the VR collaborative environment for the first machine may be output to the first VR device, e.g., see operation 232. In contrast, in response to a determination that the first machine has not entered into an area that a predetermined safety standard applies, e.g., as illustrated by the "No" logical path of decision 228, the method optionally ends, e.g., see "End." Note that although the method is described to optionally end, in some other approaches, additional monitoring may be performed. For example, throughout the workflow sequence of execution of the machines, monitoring of areas of the manufacturing location that are subject to one or more predetermined safety rules may be performed.

In some other approaches, one or more of the machines may specifically be subject to predetermined safety standards in addition to and/or alternative to the one or more predetermined areas of the manufacturing location. For example, assuming that a remote operator needs to look at an entire surrounding of a target machine, an associated extent of the VR collaborative environment may be caused to have a relatively higher degree of clarity while initiating command to be performed on the target machine. Then based on a required level of safety in the manufacturing location, a level of clarity may be different throughout the extent of the VR collaborative environment. For example, in some approaches, a target machine remotely controlled by a VR device of this remote operator may be set to have a relatively highest degree of clarify, and surrounding machines and/or remote operators subject to relatively limited safety parameters may result in other machines having a relatively lesser degree of clarity in the extent of the VR collaborative environment.

In some additional approaches, workers being present at the manufacturing location may result in some additional safety standards being applied. For example, a worker being within a predetermined proximity of a machine that is performing machine operations according to the workflow sequence of execution may pose a safety threat to the worker. Accordingly, in some approaches, in response to a determination that a worker has come within a predetermined distance from a machine, relative clarity of the worker may be increased in an extent of the VR collaborative environment output to a VR device that has remote control of the machine. In some other approaches, in response to a determination that a worker has entered a predetermined area of the manufacturing location that is subject to one or more predetermined safety standards, a relative clarity of the worker may be increased in an extent of the VR collaborative environment output to a VR device that has remote control of one or machines also in the predetermined area.

It should be noted that, although various operations described consider the condition of relative internet bandwidth, such operations may additionally and/or alternatively be performed with respect to one or more other conditions. For example, it may be assumed that the conditions include relative operator experience. In response to a determination that a first of the remote operators is not relatively very experienced, method 201 may include reassigning at least some work tasks currently assigned to a first of the remote operators using the first VR device to a second of the remote operators using the second VR device. In yet another approach, it may additionally and/or alternatively be assumed that the condition includes whether a given machine is performing machine operations with predetermined fragile product components. In response to a determination that a first machine is performing machine operations with predetermined fragile product components, method 201 may include increasing a relative degree of clarity of an extent of the VR collaborative environment output to a VR device that remotely controls the first machine. In some other approaches, it may additionally and/or alternatively be assumed that the condition includes a relative safety record of a remote operator. For example, a relative safety record of a first remote operator using a first VR device that is in control of a first machine may be monitored. In response to a determination that the safety record falls below a predetermined threshold, method 201 may include increasing a relative degree of clarity of an extent of the VR collaborative environment output to the first VR device and/or reassigning at least some work tasks currently assigned to the first remote operator.

Numerous benefits are enabled as a result of implementing the techniques described herein to manufacturing locations. For example, conditions such as differing relative internet bandwidths of VR devices are prevented from introducing latency into performance of the workflow sequence of execution at the manufacturing location. This is because these conditions are accounted for by tailoring a unique extent of the VR collaborative environment for each of the VR devices to ensure that the conditions do not introduce latency into the workflow sequence of execution at the manufacturing location. Accordingly, operations described herein allow for machine operations to be performed according to a workflow sequence efficiently and in some cases synchronously where the operations would otherwise not be performed synchronously as a result of latency remaining unaccounted for. This thereby reduces latency in performance of the workflow sequence of execution at the manufacturing location that would otherwise be present without using the techniques described herein. A reduction in latency improves performance of computer devices used in performance of the workflow sequence of execution. This also results in less waste in the production process at the manufacturing location because errors that would otherwise result in the production process as a result of such latency are avoided. It should also be noted that determining, based on conditions, an extent of a VR collaborative environment to display on a VR device has heretofore not been considered in conventional applications. In sharp contrast, latency causing conditions remain unaccounted for, which compromises manufacturing process efficiency and product quality. Accordingly, the inventive discoveries disclosed herein with regards to determining, based on conditions, an extent of a VR collaborative environment to display on a VR device, proceed contrary to conventional wisdom.

Figure 3:
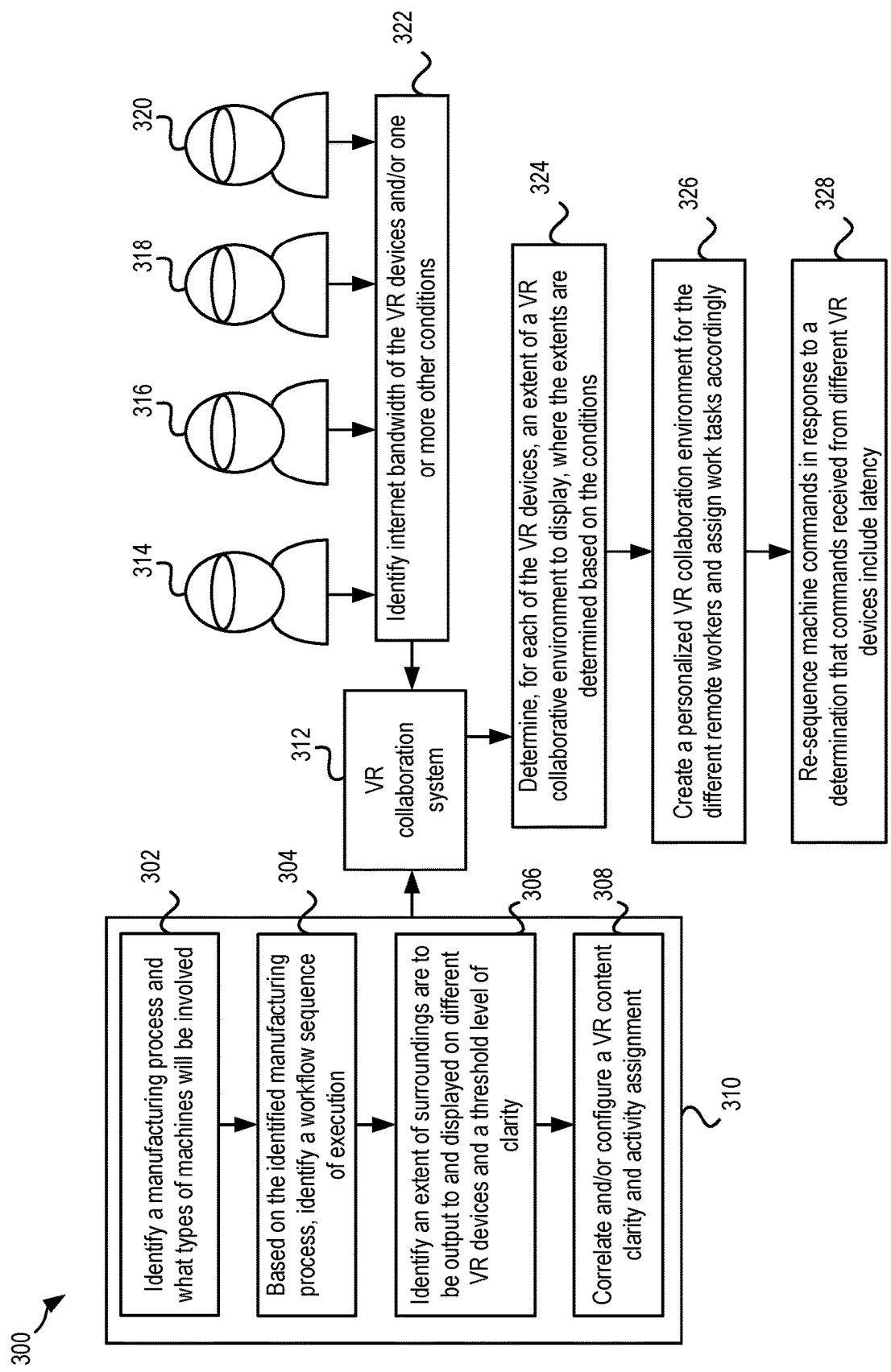
FIG. 3 is a flowchart of a method, in accordance with one approach of the present invention.

Now referring to FIG. 3, a flowchart of a method 300 is shown according to one approach. The method 300 may be performed in accordance with the present invention in any of the environments depicted in FIGS. 1-3, among others, in various approaches. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various approaches, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 of the flowchart of FIG. 3 discusses different remote operators that are enabled to collaborate with each other and operate machines of a manufacturing location, e.g., such as an industrial floor. In some approaches, operations of machines on an industrial floor may be based on changing configurations, changing operational parameters, starting commands, stopping commands, or any of other commands, and/or based on an available internet bandwidth of different VR devices used by different remote operators. Various operations of method 300 may be used to identify extents of the VR environment that are output for display on the different VR devices.

Method 300 may be implemented on any industrial floor where one or more different types of machines are performing activities according to a workflow sequence of execution, and where different machines have different specifications. In some approaches, while the machines are performing the activities, outputs of one machine may serve as an input of another of the machines that is performing activities according to the workflow. In this industrial setting, a workflow sequence of the manufacturing process may be identified, and roles of machines may be identified, e.g., see operation 302 and operation 304 of an initialization series of operations 310. For context, the role of the machines is determined by the activities that are performed and their importance to the workflow. In some approaches, these roles may be determined from work tasks currently assigned to remote operators that use VR devices to control the machines. For example, a plurality of remote operators each wearing a VR glasses device are illustrated in FIG. 3, e.g., see remote operator 314, remote operator 316, remote operator 318, and remote operator 320. Using VR devices, the workers are able to remotely configure, control, and change operational parameters of different associated machines. Relative positions and directions of different machines on the industrial floor may additionally and/or alternatively be identified, e.g., such as directions and footprints that the machines operate in during the course of performing machine operations.

While the machines are performing the activities, performance, capabilities, operational parameters, etc., of the machines may be considered and correlated into the configuration of VR contents and activity assignments, e.g., see operation 306. The VR contents may be based on an identified extent of the surroundings that are to be output to and displayed on different VR devices with a threshold level of clarity, e.g., see operation 308. This way, machine operations may be synchronized and executed according to a workflow sequence. It should be noted however, that different conditions associated with VR devices that control the machines may introduce latency into the performance of the workflow sequence. As will now be described below, method 300 may include performing operations in order to reduce this latency from being incorporated into the performance of the workflow sequence.

It may be identified which machine is being controlled from a remote location by a VR device. Furthermore, available internet bandwidths of the different remote VR devices may be identified, e.g., see operation 322. These conditions and outputs of the initialization series of operations 310 may be input into a VR collaboration system 312, which may be a trained AI model (as described elsewhere herein). An extent of a VR collaborative environment to display may be determined for each of the VR devices, where the extents are determined based on the conditions, e.g., see operation 324. Latency in performance of the workflow sequence of execution at the manufacturing location is thereby reduced by determining these extents based on these conditions. In some approaches, determining the extents of the VR collaborative environment includes identifying the manufacturing process and identifying which machines should be processed in sequence and the execution time stamp. In other words, an order of operations of the workflow sequence of execution may be determined to establish as a reference in case that the conditions create latency and cause operations to be performed out of order. An amount of bandwidth that is required for different types of VR collaborations may additionally and/or alternatively be determined in order to determine the extents of the VR collaborative environment. For example, VR devices that do not have at least a predetermined minimum threshold of internet bandwidth may not be issued work tasks to perform for the workflow sequence of execution. In some approaches, operations may include estimating the bandwidth requirements and also using historical learning about a required bandwidth of the workflow sequence of execution.

In some approaches, the extent of a VR collaborative environment to display may be determined by analyzing the workflow sequence of the manufacturing process and identifying which of the machines are actively being remotely controlled by VR devices. This way, work task reassignments may be output to VR devices that are available and active at the manufacturing location.

In some other approaches, determination of the extent of the VR collaborative environment may consider one or more safety factors that one or more machines and/or areas of the manufacturing location are subject to. For example, based on the level of safety that one or more machines and/or areas of the manufacturing location are subject to, one or more machines may be included with a relatively greater degree of clarity in an extent of the VR collaborative environment. In contrast, machines that are not present in the areas of the manufacturing location that are subject to the safety factors may not be included in the extent of the VR collaborative environment or may be included with a relatively lesser degree of clarity.

In some approaches, types of activities that are assigned to different remote operators may be based on an available internet bandwidth, e.g., see operation 326. For example, in response to a determination that a remote operator uses a VR device that has access to a relatively low internet bandwidth, the remote operator may be assigned relatively fewer work tasks and/or relatively less resource intensive work tasks. Furthermore, these work task activity assignments may be changed at any time, such as in response to a determination that a VR device that previously had relatively less internet bandwidth now has access to relatively more internet bandwidth.

Operation 328 includes re-sequencing machine commands in response to a determination that commands received from different VR devices include latency. For example, one or more operations of method 300 may include receiving timestamps associated with commands received from different remote operators. The timestamps may be evaluated with respect to the manufacturing process sequence to determine whether the machine commands are received out of order based on latency. In response to a determination that the machine commands are received out of order, one or more re-sequence instructions may be issued to correct the command execution timeline. This way latency is mitigated, and the machine execution sequence is aligned with the manufacturing process.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:
   identifying machines involved in performance of a manufacturing process at a manufacturing location;
   identifying a workflow sequence of execution of the machines;
   receiving conditions associated with remote operators using virtual reality (VR) devices to remotely control the machines to perform the workflow sequence of execution at the manufacturing location; and
   determining, for each of the VR devices, an extent of a VR collaborative environment to display, wherein the extents are determined based on the conditions, thereby reducing latency in performance of the workflow sequence of execution at the manufacturing location; and
   outputting the extents to the VR devices.

2. The computer-implemented method of claim 1, wherein the conditions include relative internet bandwidths of the VR devices.

3. The computer-implemented method of claim 2, wherein determining the extents of the VR collaborative environment includes: determining a first of the machines remotely controlled by a first of the VR devices having a relatively lower internet bandwidth, and determining a second of the machines remotely controlled by a second of the VR devices having a relatively higher internet bandwidth.

4. The computer-implemented method of claim 3, wherein determining the extents of the VR collaborative environment includes: including the first machine and not including the second machine in the extent of the VR collaborative environment for the first VR device having the relatively lower internet bandwidth, and including the first machine and the second machine in the extent of the VR collaborative environment for the second VR device having the relatively higher internet bandwidth.

5. The computer-implemented method of claim 3, wherein determining the extents of the VR collaborative environment includes: assigning the first machine to have a relatively higher degree of clarity than a degree of clarity of the second machine in the extent of the VR collaborative environment for the first VR device, and assigning the first machine to have a same degree of clarity as a degree of clarity of the second machine in the extent of the VR collaborative environment for the second VR device.

6. The computer-implemented method of claim 5, comprising: in response to a determination that the first VR device obtains control of the second machine, increasing a relative degree of clarity of the second machine in an updated version of the extent of the VR collaborative environment for the first VR device; and outputting the updated version to the first VR device.

7. The computer-implemented method of claim 6, comprising: in response to the determination that the first VR device obtains control of the second machine, decreasing a relative degree of clarity of the first machine in the updated version of the extent of the VR collaborative environment for the first VR device.

8. The computer-implemented method of claim 2, wherein determining the extents of the VR collaborative environment includes: determining a first of the machines remotely controlled by a first of the VR devices having a relatively lower internet bandwidth, and determining a second of the machines remotely controlled by a second of the VR devices having a relatively higher internet bandwidth, and comprising: reassigning at least some work tasks currently assigned to a first of the remote operators using the first VR device to a second of the remote operators using the second VR device.

9. The computer-implemented method of claim 1, wherein a predetermined safety standard applies to a first area of the manufacturing location, and comprising: in response to a determination that a first of the machines remotely controlled by a first of the VR devices has entered into and/or is scheduled to enter into the first area, increasing a relative degree of clarity of a perimeter area of the first machine in an updated version of the extent of the VR collaborative environment for the first VR device; and outputting the updated version to the first VR device.

10. The computer-implemented method of claim 1, comprising: receiving a first command from a first of the VR devices to perform a first machine operation; receiving a second command from a second of the VR devices to perform a second machine operation, wherein the first command is received before the second command is received; analyzing timestamp information of the commands to determine whether the second command was output by the second VR device before the first command was output by the first VR device; and in response to a determination, based on the analysis, that the second command was output by the second VR device before the first command was output by the first VR device, causing the second machine operation to be performed before the first machine operation.

11. A computer program product, the computer program product comprising a computer readable storage medium having program instructions embodied therewith, the program instructions readable and/or executable by a computer to cause the computer to:
   identify, by the computer, machines involved in performance of a manufacturing process at a manufacturing location;
   identify, by the computer, a workflow sequence of execution of the machines;
   receive, by the computer, conditions associated with remote operators using virtual reality (VR) devices to remotely control the machines to perform the workflow sequence of execution at the manufacturing location; and
   determine, by the computer, for each of the VR devices, an extent of a VR collaborative environment to display, wherein the extents are determined based on the conditions, thereby reducing latency in performance of the workflow sequence of execution at the manufacturing location; and
   output, by the computer, the extents to the VR devices.

12. The computer program product of claim 11, wherein the conditions include relative internet bandwidths of the VR devices.

13. The computer program product of claim 12, wherein determining the extents of the VR collaborative environment includes: determining a first of the machines remotely controlled by a first of the VR devices having a relatively lower internet bandwidth, and determining a second of the machines remotely controlled by a second of the VR devices having a relatively higher internet bandwidth.

14. The computer program product of claim 13, wherein determining the extents of the VR collaborative environment includes: including the first machine and not including the second machine in the extent of the VR collaborative environment for the first VR device having the relatively lower internet bandwidth, and including the first machine and the second machine in the extent of the VR collaborative environment for the second VR device having the relatively higher internet bandwidth.

15. The computer program product of claim 13, wherein determining the extents of the VR collaborative environment includes: assigning the first machine to have a relatively higher degree of clarity than a degree of clarity of the second machine in the extent of the VR collaborative environment for the first VR device, and assigning the first machine to have a same degree of clarity as a degree of clarity of the second machine in the extent of the VR collaborative environment for the second VR device.

16. The computer program product of claim 15, the program instructions readable and/or executable by the computer to cause the computer to: in response to a determination that the first VR device obtains control of the second machine, increase, by the computer, a relative degree of clarity of the second machine in an updated version of the extent of the VR collaborative environment for the first VR device; and outputting the updated version to the first VR device.

17. The computer program product of claim 12, wherein determining the extents of the VR collaborative environment includes: determining a first of the machines remotely controlled by a first of the VR devices having a relatively lower internet bandwidth, and determining a second of the machines remotely controlled by a second of the VR devices having a relatively higher internet bandwidth, and the program instructions readable and/or executable by the computer to cause the computer to: reassign, by the computer, at least some work tasks currently assigned to a first of the remote operators using the first VR device to a second of the remote operators using the second VR device.

18. The computer program product of claim 11, wherein a predetermined safety standard applies to a first area of the manufacturing location, and the program instructions readable and/or executable by the computer to cause the computer to: in response to a determination that a first of the machines remotely controlled by a first of the VR devices has entered into and/or is scheduled to enter into the first area, increase, by the computer, a relative degree of clarity of a perimeter area of the first machine in an updated version of the extent of the VR collaborative environment for the first VR device; and output, by the computer, the updated version to the first VR device.

19. The computer program product of claim 11, the program instructions readable and/or executable by the computer to cause the computer to: receive, by the computer, a first command from a first of the VR devices to perform a first machine operation; receive, by the computer, a second command from a second of the VR devices to perform a second machine operation, wherein the first command is received before the second command is received; analyze, by the computer, timestamp information of the commands to determine whether the second command was output by the second VR device before the first command was output by the first VR device; and in response to a determination, based on the analysis, that the second command was output by the second VR device before the first command was output by the first VR device, cause, by the computer, the second machine operation to be performed before the first machine operation.

20. A system, comprising:
   a processor; and logic integrated with the processor, executable by the processor, or integrated with and executable by the processor, the logic being configured to:

identify machines involved in performance of a manufacturing process at a manufacturing location;

identify a workflow sequence of execution of the machines;

receive conditions associated with remote operators using virtual reality (VR) devices to remotely control the machines to perform the workflow sequence of execution at the manufacturing location; and determine, for each of the VR devices, an extent of a VR collaborative environment to display, wherein the extents are determined based on the conditions, thereby reducing latency in performance of the workflow sequence of execution at the manufacturing location; and output the extents to the VR devices.

* * * * *